United States Patent
Ha et al.

(10) Patent No.: US 6,455,121 B1
(45) Date of Patent: *Sep. 24, 2002

(54) CATIONIC AND HYBRID RADIATION-CURABLE ADHESIVES FOR BONDING OF OPTICAL DISCS

(75) Inventors: Chau Thi Minh Ha, Arlington Heights; Michael G. Sullivan, Elgin, both of IL (US)

(73) Assignee: DSM N.V., Heerlen (NL)

( * ) Notice: Subject to any disclaimer, the term of this patent is extended or adjusted under 35 U.S.C. 154(b) by 8 days.

This patent is subject to a terminal disclaimer.

(21) Appl. No.: 09/729,073

(22) Filed: Dec. 5, 2000

Related U.S. Application Data

(63) Continuation of application No. 09/087,923, filed on Jun. 1, 1998, now Pat. No. 6,180,200.

(51) Int. Cl.⁷ .................................................. B32B 3/02
(52) U.S. Cl. ..................................... 428/64.1; 428/65.2
(58) Field of Search ............................. 428/64.1, 64.4, 428/65.2, 913; 430/270.11, 495.1, 945; 522/31, 66

(56) References Cited

U.S. PATENT DOCUMENTS

| | | |
|---|---|---|
| 4,694,029 A | 9/1987 | Land |
| 5,227,213 A | 7/1993 | Komori et al. |
| 5,252,694 A | 10/1993 | Kropp et al. |
| 5,360,652 A | 11/1994 | Kobayashi et al. |
| 5,399,637 A | 3/1995 | Willett |
| 5,491,193 A | 2/1996 | Erickson |
| 5,595,824 A | 1/1997 | Rustad |
| 5,663,211 A | 9/1997 | Kominami et al. |
| 5,721,289 A | 2/1998 | Karim |
| 5,897,727 A | 4/1999 | Staral |
| 6,017,603 A | 1/2000 | Tokuda et al. |
| 6,180,200 B1 * | 1/2001 | Ha .............................. 428/64.1 |

FOREIGN PATENT DOCUMENTS

| | | |
|---|---|---|
| WO | 98/36325 | 8/1998 |

OTHER PUBLICATIONS

Union Carbide Chemicals and Plastics Company, Inc., Cyracure, "Cycloaliphatic Epoxides", Cationinc UV Cure, pp. 1–24.

J.P. Fouassier and J.F. Rabek, "Radiation Curing in Polymer Science and Technology", Practical Aspects and Applications, vol. IV.

* cited by examiner

*Primary Examiner*—Elizabeth Mulvaney
(74) *Attorney, Agent, or Firm*—Pillsbury Winthrop LLP

(57) ABSTRACT

Cationic and hybrid radiation-curable pressure sensitive adhesive compositions for digital versatile discs and other substrates, a method for bonding versatile digital disc layers together with a cationic or hybrid radiation-curable pressure sensitive adhesive, and a digital versatile disc bonded by cationic or hybrid radiation-curable pressure sensitive adhesive.

22 Claims, No Drawings

CATIONIC AND HYBRID RADIATION-CURABLE ADHESIVES FOR BONDING OF OPTICAL DISCS

This is a continuation of national Application No. 09/087,923 filed Jun. 1, 1998 now U.S. Pat. No. 6,180,200 issued Jan. 30, 2001, U.S. Pat. No. 6,180,200.

1. FIELD OF INVENTION

This invention relates to cationic radiation-curable adhesive formulations and to hybrid cationic and free radical radiation-curable adhesive formulations useful for bonding together surfaces of digital versatile discs.

2. DESCRIPTION OF RELATED ART

The compact disc, or CD as it is commonly known, revolutionized the recording and computer industries, making the storage of enormous amounts of data, such as music, possible in an inexpensive, readily available medium. The technology behind the compact disc has been improved and expanded to meet the increasing storage needs of the computer and entertainment industries, culminating in the creation of digital versatile discs, or DVDs. While compact discs and digital versatile discs store information in the same general manner, the DVD design exploits CD technology to create a superior product.

Structurally, digital versatile and compact discs are very similar to one another. The information bearing surfaces of both discs are marked with indentations, or pits, arranged in a continuous spiral pattern. As the drive laser moves across the pits, the laser beam is reflected back to the driver, which receives the light signal and converts it into an appropriate format, for example, audio, video, graphic or textual format. DVDs store more data than equivalent CDs because, inter alia, the information-carrying pits are smaller and are intimately spaced in tight tracks, as opposed to the wide tracks of CDs. DVD players utilize lasers which emit red light at 650 nm and 635 nm, which are shorter wavelengths than the infrared light used in conventional CD players. These shorter wavelengths enable DVD players to accurately read the smaller, more densely packed pits of the digital versatile discs.

The compact and digital versatile discs, composed of a core member around which the information bearing surface is symmetrically arranged, are the same diameter (120 mm), and the same thickness (1.2 mm). However, instead of a single layer characteristic of traditional compact discs, digital versatile discs are made of two 0.6 mm layers of polycarbonate. This reduces the amount of distance between the surface of the discs and the pits, such that the laser penetrates less plastic in the DVDs than in CDs when accessing information. Consequently, the thinner DVD substrate enhances the read accuracy of the laser. The two bonded sides of the DVDs serve to strengthen the discs, preventing warping. Thus, digital versatile discs have greater capacity and reduced responses to environmental factors than compact discs.

Digital versatile discs may be created by variations on a few basic processes, as disclosed, for example, by U.S. Pat. No. 4,310,919 and U.S. Pat. No. 4,423,137. For example, during production of digital versatile discs, a master glass disc with the desired information is created, using a laser beam to record data from the center of the master glass disc to the outer edge of the master glass disc in a spiral pattern. After recording, the master glass disc is developed by spinning a sodium hydroxide solution over the glass surface, revealing the pits created by the laser. The developed master glass disc is then metallized with a coating of silver, followed by a coating of nickel. The nickel layer is then separated from the silver-coated master glass disc, forming a nickel reverse image of the data, known as the father copy. One or more nickel copies of this father may be generated, which can be used as a stamper in an injection molding machine to mass produce discs. Molten polycarbonate is then shot into molds containing the stamper, creating polycarbonate discs carrying the desired information. The discs are then removed from the molds with the lacquer layer adhered thereto, and a reflective metal, usually aluminum, is evaporated or sputtered on top of the polycarbonate first layer containing the information. A protective coating of lacquer is then applied over the reflective layer and dried or cured, forming a single sided disc. The stamped side of the single-sided DVD is backed by a dummy layer, onto which graphics may be applied.

The basic DVD configuration is usually modified to further enhance the capacity of the discs. The capacity of a single sided disc may be almost doubled by applying a semi-reflective data layer zero, comprising, for example, gold, over the reflective aluminum layer one. The gold layer may be read by the driver laser on a low power setting, while the aluminum layer may be accessed by increasing the power of the laser. This results in a double layer of information on a single side of a disc, imparting the DVD with currently about 8.5 GB of capacity.

Two of these single sided, dual layer discs may be bonded together back to back with a thick layer of adhesive, creating double sided, double layer digital versatile discs with currently about 17 GB of storage space. The first and second disc layers are bonded such that they are parallel to and equidistant from the core member of the disc. The adhesive employed must provide high shear strength, while keeping the information layers uniformly equidistant from each other.

Three technologies are currently employed for DVD bonding, namely contact adhesives, cationic or PSA UV bonding, and free radical UV bonding. The formulations must provide adhesion between the aluminum and polycarbonate layers, the gold and polycarbonate layers, and the lacquer and the polycarbonate layers, and various combinations thereof. Furthermore, the adhesive coatings must have a high cure speed and must wet the substrate. Following cure, these materials must have high dimensional stability and durability.

However, strong, long-lasting adhesion between DVD component layers, without compromising the other desirable properties, such as dimensional stability of the disc, is not achievable with the existing systems.

Contact adhesives are applied to discs in a hot melt process, during which temperatures are kept between 120° C. and 160° C. The adhesive is spread on the discs as a thin layer by roll coating both inner bonding surfaces. The halves are then pressed together and the adhesive is allowed to set. Flat discs may be produced at high yield rates via this method, but these discs tend to warp when stored above 70° C. or in humid environments.

During free radical UV bonding, acrylate lacquer is placed on the leading edge of a disc, after which a second disc is placed on top, and the pair is spun. The weight of the second disc promotes the movement of the lacquer toward the inner edge of the metal layer, while the spinning causes the lacquer to move to the outer edge. The adhesive is cured via UV irradiation after the spin coating process is completed. The curing process is most effective when one of the substrate layers is semi-transparent or transparent. When both substrates are opaque, high UV energy is required for curing and excess heat is generated in the process. Heat adversely affects the mechanical properties of bonded discs, such as radial tilt, tangential tilt and birefringence. Excessive heating may also negatively impact the dye and phase change layers of recording media such as DVD-R or DVD-RAM. Furthermore, acrylates shrink upon cure, often to substantial degrees, thereby preventing the formation of flat discs. This shrinkage may also reduce the environmental stability of bonded discs.

During cationic UV bonding, the adhesive is screened onto both the discs, UV irradiated, and then pressed together. The bond strengthens with time due to aging, such that after approximately 24 hrs, the disc halves are permanently attached to each other. Screening methods are milder bonding processes than are spin coating techniques. The discs produced by screening methods are flatter than with other processes, but cationic UV bonding is often plagued by air entrapment during lamination and undesirable screen textures. The cationic adhesive material produces Lewis and Bronsted acids upon exposure to actinic sources, and thus pure cationic adhesives may be corrosive to the bonded recording substrates. Additionally, the cure rate for cationic epoxy adhesives is generally slow, meaning the discs must stay in a curing station for a period to ensure complete bonding prior to stacking, requiring an extra stacker, which increases equipment costs and reduces production efficiency.

UV-curable pressure sensitive adhesives(PSA) may also be used to bond disc halves together using screen printing methods. The adhesive is "pre-shrunk", wherein two adhesive coated disc halves are cured prior to lamination and only the adhesive is directly exposed to UV radiation. Lamination is achieved by pressing the two halves together. UV-PSA adhesives cure at a faster rate than cationic adhesives. UV-PSA materials form soft adhesives, which lead to highly flexible bonded discs. This flexibility may be problematic, negatively affecting the dimensional stability of the bonded discs under some conditions. The nature of radiation curable pressure sensitive adhesives is described by Huber HF, Radiation cure of pressure sensitive adhesives. In: *Radiation curing in polymer science and technology-VolumeIV* (J. Fouassier and J. Rabek, eds.) pp. 51–71. Elsevier Applied Science, New York, 1993, the entire contents of which are hereby incorporated herein by reference.

Therefore, a need exists to provide an adhesive with the cohesive strength of cationic cure materials with the fast cure rate and low corrosive potential of UV-PSA materials for use in screen print bonding of optical discs.

SUMMARY OF THE INVENTION

One embodiment of the invention is a hybrid free radical and cationic pressure sensitive adhesive that strongly bonds screen printed opaque substrates together. The bonded substrates may be metallized or siliconized polycarbonate substrates, and UV-cured lacquer surfaces. Bonds formed by hybrid PSA are stable following exposure to elevated temperature and humidity, possess excellent mechanical properties, have suitable viscosity, reduced shrinkage and a low degree of volatility post-cure. The result is an adhesive that imparts impact resistance and uperior shear strength to bonded digital versatile discs or to other substrates.

Another embodiment of the invention is a cationic radiation curable adhesive composition which optionally includes free radical cure components.

The objects of the invention are achieved by a UV curable hybrid free radical and cationic pressure sensitive composition for use as an adhesive material comprising the combination of the following pre-mixture ingredients:

(A) about 0 wt. % to about 70 wt. % of at least one radiation-curable acrylate oligomer;

(B) about 0 wt. % to about 30 wt. % of at least one reactive diluent;

(C) about 0 wt. % to about 15 wt. % of at least one free radical photoinitiator, (D) about 10 wt. % to about 99 wt. % of at least one epoxy resin;

(E) about 0 wt. % to about 20 wt. % of at least one diol;

(F) about 0.5 wt. % to about 15 wt. % of at least one cationic photoinitiator; and (G) optionally, at least one additional additive, wherein the "pre-mixture ingredients" correspond to the identity of radiation-curable composition components prior to mixture with other ingredients.

The present invention provides for the production of a radiation-curable hybrid cationic and free radical pressure sensitive adhesive for improved bonding of digital versatile discs, methods for bonding disc components together, and discs with improved impact resistance due to the enhanced bonding properties of the hybrid cationic and free radical adhesive compound. Other substrates may be used.

Cationic and pressure sensitive adhesive systems individually are well known in the field of adhesive technology. According to the invention, copolymerization of free radical polymerizable monomers and cationic epoxy resins creates an adhesive material with superior properties to acrylate adhesives lacking the hybrid free radical and cationic PSA system. The PSA hybrid system has the cohesive strength of cationic resins combined with the fast cure and mild bonding characteristics of the PSA system.

The open face cure of the hybrid system reduces the exposure of substrates to UV radiation during cure, particularly opaque substrates, thereby preventing undesirable effects on the mechanical properties of the cured substrates. The result is a screen printable adhesive which is initially cured on two halves of, for example, a DVD, and continues to cure via cationic means after the halves are pressed together. Bonds formed under these circumstances are extremely strong without inducing side effects detrimental to the bonded substrates. Because standard adhesive materials do not provide strong, long lasting bonding between, for example, aluminum and polycarbonate substrates, especially under adverse environmental conditions, particularly elevated temperatures and humidity levels, the creation of hybrid pressure sensitive adhesive formulations is a marked improvement over the current methodology.

Although not certain, hybrid free radical and cationic PSA systems appear to allow copolymerization of epoxy moieties with acrylate moieties, thereby producing graft and block copolymers. These hybrid systems preferably include acrylate oligomers and free radical polymerizable acrylate monomers combined with epoxy resins. In the absence of acrylate compounds, cure of pure epoxy resin compositions is relatively slow, due to the slow nature of the cationic-mediated addition of epoxides to each other.

Hybrid pressure sensitive adhesive (PSA) systems of the invention incorporate cationic cure materials into acrylate adhesive compositions, thereby enhancing the cure speed of the cationic moiety. Incorporation of up to 98% by weight cationic epoxy materials into acrylate compositions reduces shrinkage and markedly improves bond strength of the cured acrylate adhesives. These surprising improvements provide for, amongst other benefits, superior screen printing of DVD substrates.

Mechanisms of cationic UV cure and free radical cure are described in *Cyracure, Cycloaliphatic Epoxides*, Union Carbide Chemicals and Plastics Company, Inc., Danbury, Conn. (1992), Billmeyer F W, *Textbook of Polymer Chemistry*. Interscience Publishers, Inc, New York (1957), the entire contents of which are incorporated herein by reference.

DETAILED DESCRIPTION OF THE INVENTION

One embodiment of the present composition is a novel formulation for synthesizing a hybrid cationic and free radical pressure sensitive adhesive (PSA) with strong bonding properties, particularly for metallic substrates, such as gold and aluminum, ceramics, such as silicon, and polycarbonates. An important aspect of the first embodiment of the invention is the copolymerization of acrylate oligomers and acrylate monomers with cationic epoxy resin systems. Acrylate monomers are preferred for their high rates of polymerization. The hybrid PSA system, comprising acrylate monomers and epoxy resins, significantly improves the adhesive properties of acrylate adhesive coatings for use in bonding a variety of substrates.

Another embodiment of the invention is a cationic radiation curable pressure sensitive adhesive composition which optionally includes free radical cure components.

A suggested mechanism for photoactivated hybrid PSA addition reactions includes UV absorption by a free radical photoinitiator, which initiates free radical formation via decomposition of the initiator, followed by radical attack of an unsaturated carbon in an acrylate compound, concluding with termination by formation of radical-radical combinations. Cationic photoinitiators generate superacids, which catalyze the addition of hydroxyl and epoxide moieties to epoxides promoting cure of epoxy resins in the hybrid system. Inclusion of cationic species in acrylate adhesive compositions is advantageous, as upon removal of the actinic radiation, cationic systems continue to polymerize thermally, thus increasing bond strength. The adhesive remains in the liquid state after irradiation, and no surface cure is detectable. Cured adhesive compositions solidify within two minutes of UV radiation. The result is a hybrid PSA adhesive that upon cure imparts, for example, impact resistance and superior shear strength to bonded digital versatile discs.

When manufacturing digital versatile discs, the protective layer of a first polycarbonate substrate may be bonded to the protective layer of a second polycarbonate substrate by a hybrid free radical and cationic PSA adhesive comprising an acrylic UV resin combined with an epoxy resin. Adhesion of, for example, aluminum and polycarbonate layers may also be achieved with hybrid PSA compositions. Additives are often included in radiation-curable coatings to modify the properties of the compositions to meet specific needs. Basic additives must be avoided in hybrid PSA systems as bases neutralize the super acid produced by cationic initiators, thereby slowing cationic cure. When hybrid PSA systems are radiation-cured on a substrate, such as a polycarbonate surface, the final result is a product with pronounced adhesion and good bonding strength.

The types and amounts of acrylate oligomer, acrylate monomer diluents, epoxy resins, cationic diluents, photoinitiators and additives may be adjusted according to the ultimate use of the product. Compositions can comprise at least one radiation-curable acrylate oligomer, at least one radiation-curable reactive diluent, at least one photoinitiator, at least one epoxy compound, at least one diol and optional additives. The weight ratio of the cationic component to the PSA component of the composition may be from about 99:1 to about 80:20, to as low as about 40:50, and preferably is from about 60:40 to about 50:50. Additives will bring the total weight value to 100% in each case. The composition may be tailored to maximize the adhesiveness, reduce the viscosity, shorten cure speed, and the like of the cured material. For example, radical polymerizable monomers and optionally silane compounds, may be added at varying effective concentrations to achieve improved viscosity and adhesion, respectively. By altering the ratios of components, other desirable properties may be promoted, such as high optical transparency, hardness, chemical resistance, and abrasion resistance.

The exact combinations selected for the use in radiation-curable adhesive coating compositions may vary, depending upon the other components of the composition and the light sources used to cure the composition. Components should be excluded from the formulation which, prior to cure, cause insoluble salts to form, which may impair the optical properties of the bonded disc.

The radiation-curable compositions can be cured by conventional means. For instance, the radiation source can be a conventional light source, such as, for example, UV lamps available from Fusion Systems Corp. In addition, low-, medium- and high-pressure mercury lamps, superactinic fluorescent tubes or pulse lamps are suitable. Radiation-cure is preferably by actinic radiation and more preferably by UV radiation. When using the preferred UV cure of the adhesive compositions, proper control of light intensity is important to help control shrinkage of the polymerized material.

The radiation-curable oligomer can be any radiation-curable oligomer used in radiation-curable, adhesive coating compositions. An example of a suitable radiation-curable oligomer includes an urethane oligomer having a molecular weight of at least about 500 and containing at least one ethylenically unsaturated group that can be polymerized through actinic radiation. For example, if the diluent is present in the coating composition, the ethylenically unsaturated group can be the reactive terminus of the oligomer to which the reactive diluent is bound when the composition is cured. Preferably, the oligomer has two terminal radiation-curable functional groups, one at each end of the oligomer. Oligomers with low glass transition values are preferred.

Representative oligomers are disclosed in, for example, U.S. Pat. No. 4,932,750, which is hereby incorporated by reference.

The radiation-curable oligomer is preferably present in an amount of about 0% to about 70% by weight, and more preferably, about 30 wt. % to about 40% wt. %.

Examples of suitable radiation-curable functional groups which can be present on the oligomer include ethylenically unsaturated groups including (meth)acrylate or vinylether groups. The language "(meth)acrylate" as used herein, means methacrylate, acrylate, or mixtures thereof.

Preferably, the radiation-curable group in the oligomer is a (meth)acrylate or vinylether group.

Preferably, the oligomer contains at least two ethylenically unsaturated groups which are bound to an oligomer backbone. For example, ethylenically unsaturated groups can be present at each end of the oligomer backbone as reactive termini. The oligomer backbone can be, for example, based on a polyether, polyolefin, polyester, polycarbonate, acrylic, hydrocarbon, polyolefin, or copolymers thereof. Preferably, the oligomer backbone comprises repeating urethane units The radiation-curable oligomer can be an acrylic oligomer comprising at least one radiation-curable (meth)acrylate group, and preferably, at least one acrylate group. These are known in the art as acrylated acrylics.

The invention is not believed to be limited by how the acrylated acrylic oligomer, or any other oligomer, is prepared. Oligomer synthetic routes for acrylated acrylics can, for example, involve an esterification of a hydroxyl-functional acrylic oligomer with (meth)acrylic acid, or the reaction of an epoxy-functional acrylic oligomer with (meth) acrylic acid. These acrylated acrylics can include urethane linkages. Preferred acrylated acrylic oligomers include species of at least Mn 5,000. Preferred acrylated urethane acrylics are described in U.S. application Ser. No. 08/740, 725, the entire disclosure of which is hereby incorporated by reference.

Acrylated acrylics can be prepared by known synthetic methods including, for example, (1) partial esterification of acrylic polymers having pendant carboxylic acid group with hydroxyethyl acrylate or glycidyl methacrylate, or in the alternative, acrylation of glycidyl methacrylate terpolymer with acrylic acid, or (2) polymerization of monomers which already have acrylate groups such as, for example, allyl methacrylate or N,N-dimethylaminoethyl methacrylate.

The acrylic oligomer typically will have a copolymeric backbone. The glass transition temperature (Tg) of the oligomer can be lowered by decreasing the content of methyl methacrylate.

(Meth)acrylic acid and ester polymers are disclosed in, for example, *Encyclopedia of Polymer Science & Engineering*, Vol. 1, 1985, pgs. 211–305, the complete disclosure of which is hereby incorporated by reference.

The oligomer backbone can comprise one or more oligomeric blocks coupled with each other via, for example, urethane linkages. For example, one or more types of polyol prepolymers can be linked by methods known in the art.

If the oligomer backbone is a polyether, the resulting adhesives can have a low glass transition temperature and good mechanical properties. If the oligomer backbone is a polyolefin, the resulting adhesives can have a further improved water resistance. Polycarbonate-based oligomers can provide for good stability.

Oligomers with repeating urethane units can be, for example, prepared by reaction of (i) an oligomer polyol, (ii) a di-or poly-isocyanate and (iii) a hydroxy functional ethylenically unsaturated monomer such as, for example hydroxyalkyl(meth)acrylate.

If an oligomer backbone polyol is used, preferably it has on average at least about two hydroxyl groups. The oligomer backbone polyol may have, on average, more than two hydroxyl groups. Examples of such an oligomer diol include polyether diols, polyolefin diols, polyester diols, polycarbonate diols, and mixtures thereof. Polyether and polycarbonate diols, or combinations thereof, are preferred.

If a polyether diol is used, preferably the polyether is a substantially non-crystalline polyether. Preferably, the polyether comprises repeating units of one or more of the following monomer units:

—O—CH$_2$—CH$_2$—
—O—CH$_2$—CH(CH$_3$)—
—O—CH$_2$—CH$_2$—CH$_2$—
—O—CH(CH$_3$)—CH$_2$—CH$_2$—
—O—CH$_2$—CH(CH$_3$)—CH$_2$—
—O—CH$_2$—CH$_2$—CH$_2$—
—O—CH$_2$—CH(CH)$_3$—CH$_2$—CH$_2$—
—O—CH(CH$_3$)—CH$_2$—CH$_2$—CH$_2$—.

An example of a polyether polyol that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTGL 1000™ (Hodogaya Chemical Company of Japan). Another example of a polyether in this series which can be used is PTGL 2000™ (Hodogaya Chemical Company). Another example of a polyether which can be used is polyarylicdiol.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Admixtures of the polycarbonate diols and polycarbonate copolymers can also be utilized.

Polycarbonate diols include, for example, DURACARB 122™ (PPG Industries) and PERMANOL KM10-1733™ (Permuthane, Inc., Ma.). DURACARB 122™ is produced by the alcoholysis of diethylcarbonate with hexane diol.

Any organic polyisocyanate (ii), alone or in admixture, can be used as the polyisocyanate. Thereby, a product is obtained which is end-capped with the reaction product from the isocyanate/ethylenically unsaturated monomer reaction on at least one end of the molecule. "End-capped" means that a functional group caps one of the two ends of the oligomer diol.

The isocyanate/hydroxy functional monomer reaction product attaches to the oligomer backbone (i) diol via a urethane linkage. The urethane reactions can take place in the presence of a catalyst. Catalysts for the urethane reaction include, for example, dibutyl-tin dilaurate, diazabicyclooctane crystals and the like.

Preferably the polyisocyanate (ii) is a diisocyanate. Examples of diisocyanates (ii) include isophorone diisocyanate (IPDI), tetramethylxylene diisocyanate (TMXDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the diisocyanates are non-yellowing diisocyanates such as isophorone diisocyanate.

Generally the compound providing a reactive terminus (iii) contains a functional group which can polymerize under the influence of actinic radiation, and the compound contains a functional group which can react with the diisocyanate. Hydroxy functional ethylenically unsaturated monomers are preferred. More preferably, the hydroxy functional ethylenically unsaturated monomer contains acrylate, (meth)acrylate or vinyl ether functionality.

The composition according to the invention may comprise at least one reactive diluent. Reactive diluents can be used to adjust the viscosity of the adhesive composition. Thus, the reactive diluent can be a low viscosity monomer containing at least one functional group capable of polymerization when exposed to actinic radiation. For example, vinyl reactive diluents and acrylate monomer diluents may be used. Cationic diluents, such as cycloaliphatic epoxides or epoxy alkanes, may also be suitable. Vinyl ethers and polyols may serve as reactive diluents.

The reactive diluent is preferably added in such an amount that the viscosity of the coating composition is greater than 500 cps, and preferably greater than 1,000 cps. The viscosity of the composition should be greater than 1,000 cps to avoid screen leakage during the screen printing process. Suitable amounts of the reactive diluents have been found to be about 1 wt % to about 70 wt %, and more preferably about 10 wt. % to about 50 wt. %.

The reactive diluents preferably have a molecular weight of not more than about 550 or a viscosity at room temperature of less than about 500 mPas (measured as 100% diluent).

The functional group present on the reactive diluent may be of the same nature as that used in the radiation-curable oligomer or epoxy resin. Preferably, the radiation-curable functional group present in the reactive diluent is capable of copolymerizing with the radiation-curable functional group present on the radiation-curable oligomer.

Preferably, the reactive diluent system comprises monomers having an acrylate and vinyl ether functionality and an $C_4$–$C_{20}$ alkyl or polyether moiety. Examples of such reactive diluents are:
hexyl acrylate,
2-ethylhexyl acrylate,
isobornyl acrylate,
decyl acrylate,
lauryl acrylate,
stearyl acrylate,
ethoxyethoxy-ethyl acrylate,
isodecyl acrylate,
isooctyl acrylate,
laurylvinyl ether,
2-ethylhexylvinyl ether,
N-vinyl formamide and derivatives thereof,
N-vinyl carbazole,
N-vinyl-caprolactam,
N-vinylpyrrolidone and the like.

Furthermore, the reactive diluents preferably contain two groups capable of polymerization using actinic radiation. A diluent having three or more of such reactive groups can be present as well. Examples of such monomers include:
$C_2$–$C_{18}$ hydrocarbondioldiacrylates,
$C_4$–$C_{18}$ hydrocarbondivinylethers,
$C_3$–$C_{18}$ hydrocarbontrioltriacrylates,
the polyether analogs thereof, and the like, such as
1,6-hexanedioldiacrylate,
trimethylolpropanetriacrylate,
hexanedioldivinylether,
triethyleneglycoldiacrylate,
pentaeritritoltriacrylate, and
tripropyleneglycoldiacrylate.

Ethylene glycol, aliphatic vinyl ethers and aromatic vinyl ethers are suitable.

Preferably, the oligomer and the at least one radical polymerizable monomer diluent each contain an acrylate group as a radiation-curable group.

The composition contains at least one cationic cured epoxy resin, preferably present in an amount from about 10 wt. % to about 99 wt. %. Suitable epoxy resins include bisphenol-A, cycloaliphatic epoxides, bisphenol-F, and mixtures thereof. Preferred epoxy resins include mixed cycloaliphatic epoxides, bis-(3,4-epoxycyclohexyl) adipate, bisphenol-A epoxide and bisphenol-F epoxide. Bisphenol-A epoxide is known to give good surface cure. Excellent through cure is achievable with bisphenol-F epoxide, and is most preferred.

The composition may optionally further comprise at least two photoinitiators, which are required for fast UV cure. Conventional photoinitiators can be used. Examples of free radical photoinitiators include benzophenones, acetophenone derivatives, such as alpha-hydroxyalkylphenylketones, benzoin alkyl ethers and benzil ketals, monoacylphosphine oxides, and bisacylphosphine oxides. A preferred photoinitiator is 1-hydroxycyclohexyl phenylketone(IRGACURE 184™, Ciba Geigy). Another preferred example is 2,2-dimethoxy-2-phenyl acetophenone (IRGACURE 651™, Ciba Geigy). Other suitable photoinitiators include mercaptobenzothiazoles, mercaptobenzooxazoles and hexaryl bisimidazole. Cationic photoinitiators include onium salts of antimony and phosphate, such as mixed triarylsulfonium hexafluoroantimonate salts and mixed triarylsulfonium hexafluorophosphate salts. Hexafluorophosphate salts are faster at initiating cure in the hybrid PSA system of the invention than hexafluoroantimonate salts. Mixtures of cationic and free radical photoinitiators provide a suitable balance of properties in hybrid PSA adhesive systems. Free radical photoinitiators may be present in amounts ranging from about 0 wt. % to about 15 wt. %. Cationic photoinitiators may be present in the composition of the invention in amounts ranging from about 0.5 wt. % to about 15 wt. %.

Additional compounds are commonly included in radiation-curable coatings, including adhesive coatings, and can be used in effective amounts.

Thiol compounds can be used in UV-curable acrylate oligomer compositions to enhance the bonding properties of the adhesives. Preferably, the radical polymerizable monomer forms thioether linkages during radiation-cure. Such thioether linkages can form by thiol-ene reactions. Thiol-ene systems are the result of combining thiol moieties, such as mercapto silanes, and vinyl components, such as N-vinyl pyrrolidone during radiation cure. Aliphatic thiol compounds, such as $C_5$–$C_{30}$, preferably $C_5$–$C_{20}$ alkanethiol compounds, are suitable reactants. Examples of alkanethiols include 1-pentanethiol, 1-heaxanethiol, 1-heptanethiol, 1-octanethiol, 1-decanethiol, 1-dodecanethiol, and the like. Compounds comprising a plurality of mercapto groups can be used, including di- and tri-mercapto compounds. Preferred examples of thiol compounds are γ-mercaptopropyltrimethoxysilane and γ-mercaptopropyltriethoxysilane. Thioethers are also preferred. Such thiol-ene systems, when copolymerized with acrylates, provide for compositions with superior adhesive qualities.

Additionally, additives may be included in the formulations. Minor amounts of UV absorbers, typically those of the benzotriazole, benzophenone or oxanilide type, or sterically hindered amine type (HALS) may be added as light stabilizers. Further customary additives as used in the art include fillers, chain transfer agents, plasticizers, wetting agents, stabilizers, adhesion promoters or leveling agents. For example, alcohols and polyols behave as chain transfer agents with epoxides, improving cure speed of cationic formulations. Suitable polyols include ε-caprolactone triol crosslinking agents of viscosities at 55° C. ranging from 2250 cP to 2700 cP. Diols, such as ethylene glycol, butane glycol and propane glycol outperform other polyols, and are preferred. Ethylene glycol is most preferred. Glycols may be present in the hybrid adhesive composition in a range of from about 0 wt. % to about 20 wt. %. Mercaptosilanes, as described above, are preferred adhesion promoters. When thiol compounds other than mercaptosilanes are used, silane adhesion promoters are preferred. Such silane adhesion promoters are known in the art. Examples include isocyanotoalkyltrialkoxysilanes, methacrylylalkyl-trialkoxysilanes, amino alkyltrialkoxysilanes and epoxy-alkyltrialkoxy silanes. The alkyl group generally is propyl, and as the alkoxy group, methoxy or ethoxy is preferred. Another suitable silane adhesion promoter is vinyltri-methoxysilane. Mercaptosilanes, such as mercaptopropylt-rimethoxysilane and mercaptopropyltriethoxysilane, are particularly preferred. Thermal antioxidants may be used to improve thermal and oxidative stability. Thickeners, leveling agents, antifoam agents, thixotropic agents and tackifying agents are preferred additives. Other polymers and oligomers can be added to the compositions as needed.

Cure speed can be measured by dose-modulus curves as known in the art. Cure speed can be taken as the dose required to effect 95% of the maximum modulus. For an adhesive coating, UV cure speed is preferably about 1.0 J/cm$^2$, more preferably about 0.3 J/cm$^2$ or less at 95% of maximum attainable modulus.

For an adhesive coating, density at 25° C. is about 1.02 g/ml. The adhesive composition preferably has a viscosity of about 100 to about 30,000 mPas at 25° C. Elongation is preferably at least 2% or more. The shrinkage upon cure should be ≦7%, with respect to the density of cured material. Bond strength is preferably rated about 4 to about 5. Shear strength is preferably about 10 lbs to about 50 lbs. Cured adhesive bonds are preferably stable under exposure to about 85° C. at about 85% relative humidity for at least 96 hrs.

This invention provides an improved method for addressing the above-mentioned formulation difficulties. UV-curable compositions with good adherence to plastic, metallic, ceramic substrates, and cured CD lacquer. The compositions may therefore be useful for bonding single-sided digital versatile discs together or for bonding the individual layers comprising a single-sided disc. The hybrid free radical and cationic adhesives of the invention are particularly suitable for open face bonding of opaque substrates, thereby avoiding exposure of the substrates to high intensity UV radiation. Other substrates may also be bonded by the adhesive composition. Unexpectedly superior adhesiveness is achieved with this composition, providing an excellent material to meet adhesion requirements for digital versatile disc manufacture.

The compounds forming the radiation curable adhesive compositions are combined to form a thixotropic mixture and coated on, for example, one surface of each of two polycarbonate substrates forming the DVD, which surfaces are already coated with an aluminum, gold or other layer encoded with audio, video or other information and protected by a UV curable lacquer. The adhesive is coated on the substrates by screen printing or other suitable method known in the art. The adhesive on the substrates is then cured with ultraviolet radiation at a dose of about 0.2–1.0 J/cm$^2$, preferably about 0.4 J/cm$^2$. Radiation-cure may be effected using a fusion lamp equipped with a "H" bulb or a "D" bulb from Fusion Curing Systems, Rockville, Maryland, or the equivalent thereof, in an air atmosphere. The cured adhesive coated substrates are superimposed on each other with the adhesive bonding the substrate layers together, thereby forming a single DVD having one or preferably two layers of encoded audio or video information which may be read in a DVD player. Substrate layers which may be bonded by the invention in various combinations comprise plastics, metallics and ceramics. The adhesive composition are preferably applied to the disc layers by screen printing.

The production of and useful characteristics for optical disc adhesives are discussed in, for example, U.S. Pat. Nos. 4,861,637, 4,906,675 5,360,652, 5,663,211, 5,227,213 and 5,213,947 which are hereby incorporated in their entirety by reference.

Optical disc production is described in, for example, Network Formation by Chain Crosslinking Photopolymerization and its Applications in Electronics, by J. G. Kloosterboer in *ADV. POLYM. SCI.*, 1988, 84, pp. 1–61, the complete disclosure of which is hereby incorporated by reference.

The invention will be further explained by the nonlimiting examples which follow.

EXAMPLES

Example I: Production of a Hybrid Pressure Sensitive Urethane Acrylate Radiation-Curable Adhesive A solution containing a polycarbonate urethane diacrylate oligomer (Tg 14° C. Desotech); isobornylacrylate (IBOA), a vinyl ether diluent (DVE-3™, ISP), mixed cycloaliphatic epoxides (UVR-6100™, Union Carbide, Conn.) photoinitiators IRGACURE 184™ (Ciba Geigy) and mixed triarylsulfonium hexafluorophosphate salts (UVI 6990™, Union Carbide, Conn.), the thiol additive adhesion promoter γ-mercaptotrimethoxysilane and a tackifier (Sylvatac 1100™, Hercules, N.C.) was prepared utilizing the proportions listed in Table 1. The reagents were, heated for 1 hr at 60° C., after which the components were mixed by shaking until homogeneous. The resulting material had a viscosity of 685 mPas, as measured by a Physica™ LC3 viscometer. The polymer, having a distinct tackiness, was subsequently tested for adhesive properties on DVDs.

TABLE 1

| Components | Example I wt. % |
| --- | --- |
| Polycarbonate urethane diacrylate oligomer | 21.6 |
| Isobornylacrylate diluent | 18.9 |
| Free radical initiator | 1.35 |
| Epoxy resin | 330 pas |
| Vinyl ether diluent | 2.25 |
| Diol | 4.41 |
| Cationic initiator | 0.93 |
| γ-mercaptopropyltrimethoxysilane | 0.9 |
| Tackifier | 10 |
| Viscosity (@25° C.) | 685 cps |
| Texture | Tacky |

Properties of Example 1 in DVD Binding.

An aluminum disc was spin coated with a protective coating at 5,000 rpm for 5s, then cured at 0.3 J/cm$^2$ using a Fusion H lamp. The protected aluminum disc was screen printed with an adhesive layer composed of the reagents of Table 1. A polycarbonate disc was likewise coated with an adhesive layer and cured. The two substrate discs were pressed together, avoiding the inclusion of any air bubbles. The adhesive between the discs was allowed to "dark" cure in the absence of additional UV radiation for 24 hours prior to testing. Impact resistance (bond strength) of the bonded discs when dropped onto concrete from a height of 75 cm was measured before and after the adhered discs were exposed to environmental stress (85° C. at 85% relative humidity(RH) for 500 hrs). Bond stress of bonded DVD were measured by comparing disc impact resistance before and after environmental stress exposure. The results of these tests are presented in Table 2

TABLE 2

| Bonded Digital Versatile Discs | Values |
|---|---|
| Bond strength, @25° C./40% RH (500 hrs) | 5 |
| Bond strength, @85° C./85% RH (500 hrs) | 5 |

Examples II and III: Production of Pressure Sensitive Hybrid Urethane Acrylate Radiation-Curable Adhesives Formulations for Examples II and III were tested according to the methodology for Example I. The compositions and test results of Example II and Example III are listed in Table 3. The polyurethane acrylated acrylic is characterized by Mn 1,000 and Tg −10° C.

TABLE 3

| Components | Example II (Wt. %) | Example III (Wt. %) |
|---|---|---|
| Acrylated acrylic oligomer | 39 | 23.63 |
| Isobornyl acrylate | 15 | 20.7 |
| Free radical initiator | 1.8 | 2 |
| Mixed cycloaliphatic epoxides | | 27.61 |
| Bis-(3,4-epoxycyclohexyl) adipate | 30.16 | 13.8 |
| Vinyl ether diluent | 3 | 2.42 |
| Polyol | 8 | 4.44 |
| Antimonate salt cationic initiator | 1.6 | |
| Phosphate salt cationic initiator | | 2 |
| γ-mercaptopropyltrimethoxysilane | 1.2 | 1 |
| CAB3B1-0.1 Thickener | | 2.2 |
| Foam blast additive FB20F | 0.24 | 0.2 |
| Viscosity (cps @25° C.) | 2530 | 1015 |
| Texture | Tacky | Tacky |
| Bond strength @ 25° C./40% RH | 5 | 5 |
| Bond strength @ 85° C./85% RH (96 hrs) | 5 | 5 |

Example IV

Cationic cure adhesive compositions may be formulated according to the second embodiment of the invention, providing a bisphenol-F epoxy resin is used. Accordingly, the components of Table 4 were combined, and used to bond DVD substrates as previously described. The properties and test results for the cationic cure adhesive are presented below.

TABLE 4

| Component | Values |
|---|---|
| Bisphenol-F epoxy resin | 5 |
| Sulfonium phosphate cationic photoinitiator | 5 |

TABLE 4-continued

| Component | Values |
|---|---|
| Viscosity @25° C. | 3,000 cps |
| Bond Strength, @85° C./85% RH (500 hrs) | 5 |

Test Methods

Viscosity

The viscosity was measured using a PHYSICA MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. Samples in the cup were examined for excessive amounts of bubbles, which if noted, were removed by a direct means such as centrifugation. Alternatively, enough time was allowed to elapse so as to let the bubbles escape from the bulk of the liquid. Bubbles at the top surface of the liquid were acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which produced the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If the reading varied, the temperature may not have reached an equilibrium value, or the material may have changed due to shearing. In the latter case, further testing at different shear rates is needed to define the sample's viscous properties. The results reported are the average viscosity values of three test samples.

Bond Strength

The bond strength of bonded digital versatile discs bonded with a cured adhesive was measured via a drop testing method. The cured, bonded discs were dropped a vertical distance of 3 feet to a concrete surface, such that the outer edges of the bonded discs impacted the concrete. The impact resistance of cured sample adhesive compositions was qualitatively rated as noted hereinbelow.

Rating Scale of 1–5

1 Worst; delamination of the two disc halves occurred

5 Best; no sign of impact-induced delamination of the two disc halves

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A radiation-curable adhesive composition for bonding optical disc components comprising the combination of the following pre-mixture ingredients:
   (A) about 0 wt. % to about 70 wt. % of at least one radiation-curable acrylate oligomer;
   (B) about 0 wt. % to about 30 wt. % of at least one reactive diluent;
   (C) about 0 wt. % to about 15 wt. % of at least one free radical photoinitiator,
   (D) about 10 wt. % to about 99 wt. % of at least one epoxy resin;
   (E) about 0 wt. % to about 20 wt. % of at least one diol;
   (F) about 0.5 wt. % to about 15 wt. % of at least one cationic photoinitiator; and
   (G) a mercaptosilane adhesion promoter.

2. The composition of claim 1, wherein said at least one epoxy resin comprises a member selected from the group consisting of bisphenol-A epoxy resins and bisphenol-F epoxy resins.

3. The composition of claim 1, comprising about 0.5% to about 15% of said at least one diol.

4. The composition of claim 3, wherein said at least one diol comprises a member selected from the group consisting of ethylene glycol, propane glycol, and butane glycol.

5. The composition of claim 1, wherein said at least one cationic initiator comprises a member selected from the group consisting of mixed triarylsulfonium hexafluoroantimonate salts and mixed triarylsulfonium hexafluorophosphate salts.

6. The composition of claim 1, wherein said composition has a viscosity of greater than about 1,000 cps at 25° C.

7. The composition of claim 1, further comprising a UV absorber.

8. The composition of claim 1, wherein the composition comprises a γ-mercaptopropyltrimethoxysilane adhesion promoter.

9. A radiation-curable adhesive composition for bonding optical disc components comprising the combination of the following pre-mixture ingredients:
   (A) about 0 wt. % to about 70 wt. % of at least one radiation-curable acrylate oligomer;
   (B) about 0 wt. % to about 30 wt. % of at least one reactive diluent;
   (C) about 0 wt. % to about 15 wt. % of at least one free radical photoinitiator,
   (D) about 10 wt. % to about 99 wt. % of at least one bisphenol F epoxy resin;
   (E) about 0 wt. % to about 20 wt. % of at least one diol selected from the group consisting of ethylene glycol, propane glycol and butane glycol;
   (F) about 0.5 wt. % to about 15 wt. % of at least one cationic photoinitiator; and
   (G) optionally, an adhesion promoter.

10. The composition of claim 9, comprising about 0.5% to about 15% of said at least one diol.

11. The composition of claim 10, wherein said at least one diol comprises a member selected from the group consisting of ethylene glycol, propane glycol, and butane glycol.

12. A radiation-curable adhesive composition for optical disc components comprising the combination of the following pre-mixture ingredients:
   (A) about 0 wt. % to about 70 wt. % of at least one radiation-curable acrylate oligomer;
   (B) about 0 wt. % to about 30 wt. % of at least one reactive diluent;
   (C) about 0 wt. % to about 15 wt. % of at least one free radical photoinitiator,
   (D) about 10 wt. % to about 99 wt. % of at least one epoxy resin selected from the group consisting of bisphenol A epoxy resins and bisphenol F epoxy resins;
   (E) about 0.5 wt. % to about 15 wt. % of at least one diol selected from the group consisting of ethylene glycol, propane glycol and butane glycol;
   (F) about 0.5 wt. % to about 15 wt. % of at least one cationic photoinitiator; and
   (G) a mercaptosilane adhesion promoter.

13. A method of bonding optical disc layers, comprising bonding at least two of the layers of the disc with the adhesive composition of claim 1.

14. A method of bonding optical disc layers, comprising bonding at least two of the layers of the disc with the adhesive composition of claim 9.

15. A method of bonding optical disc layers, comprising bonding at least two of the layers of the disc with the adhesive composition of claim 12.

16. The method of claim 13, comprising applying the adhesive composition to the disc layers by screen printing, roll coating, spin coating or capillary gap dispensing.

17. An optical disc comprising at least two layers bonded with the composition of claim 1.

18. An optical disc comprising at least two layers bonded with the composition of claim 9.

19. An optical disc comprising at least two layers bonded with the composition of claim 12.

20. The optical disc of claim 17, wherein the shear strength of the optical disc is from about 10 lbs to about 100 lbs.

21. The optical disc of claim 17, wherein said optical disc is a digital versatile disc.

22. A digital versatile disc structure comprising two digital versatile discs according to claim 21, wherein two single sided digital versatile discs are symmetrically bonded on each side of a core member, which is equidistant and parallel to each single sided disc.

* * * * *